Patented Mar. 12, 1940

2,193,630

UNITED STATES PATENT OFFICE 2,193,630

HARDENER FOR FORMALDEHYDE-UREA ADHESIVES

Arthur M. Howald, Toledo, Ohio, assignor to Plaskon Company, Incorporated, Toledo, Ohio, a corporation of Delaware.

No Drawing. Application June 13, 1938, Serial No. 213,501

11 Claims. (Cl. 260—29)

Formaldehyde-urea solutions are valuable as adhesives because the dissolved formaldehyde-urea compound is thermosetting and can therefore be rendered insoluble after the adhesive has been applied, to produce a water-resistant bond. Adhesives made from thermosetting resins, however, generally must be subjected to high temperature and pressure in order to produce water-resistant bonds. Most manufacturers employ unheated presses because they find heated presses too expensive, so that adhesives made from thermosetting resins have not heretofore been widely used. The adhesives used in greatest quantities by large consumers, such as plywood manufacturers, are ordinary glues, which form bonds that are not water resistant and are therefore inferior to bonds from thermosetting resins.

Formaldehyde-urea adhesives show great promise; for when a formaldehyde-urea adhesive is acidified immediately before being applied, the formaldehyde-urea compound gradually becomes insoluble and thus produces a water-resistant bond in the cold. However, a formaldehyde-urea adhesive that has been properly acidified so that it produces a water resistant bond is extremely difficult to use in practice, because the formaldehyde-urea compound in such an adhesive tends to become insoluble before the operator has had time to spread the adhesive on the surfaces to be glued. If the operator uses an adhesive of low enough acidity to give him time to apply the adhesive before it becomes hard, then the adhesive does not give water-resistant products.

The principal object of the invention is to provide a hardener for formaldehyde-urea adhesives which is convenient to use, and which renders the adhesives stable to give ample time for applying them, and subsequently causes rapid hardening of the adhesives to produce water-resistant bonds. More specific objects and advantages are apparent from the description, which merely discloses and illustrates the invention and is not intended to impose limitations upon the claims.

The hardener of the present invention comprises an ammonium salt of a strong acid and an ammonium salt of a substantially weaker acid. When the hardener is added to a solution of a formaldehyde-urea reaction product, the resulting adhesive is ready to apply. Since the hardener cannot be added to a formaldehyde-urea solution until just before the solution is applied, the hardener and the formaldehyde-urea solution must be kept separate during shipment. Preferably the hardener takes the form of a dry mixture of the two salts. A solid substance such as a powder is much more convenient to ship than a liquid. Thus the formaldehyde-urea compound may also be shipped in the form of a powder that can be dissolved by the user to form an adhesive solution.

In some cases a dry mixture comprising a soluble formaldehyde-urea reaction product, an ammonium salt of a strong acid, and an ammonium salt of a substantially weaker acid may be prepared so that the operator can make up an adhesive ready for use by simply adding water to the dry mixture containing all the necessary ingredients. If desired, the powdered hardener may be enclosed in a separate package and placed inside a barrel of powdered formaldehyde-urea compound with which it is to be dissolved to form an adhesive.

After the addition of the present hardener to a solution of a formaldehyde-urea reaction product, the solution gradually becomes acid, because the free formaldehyde in the solution slowly combines with ammonia from the ammonium salts to form hexamethylenetetramine, which is substantially inert. An ammonium salt of a strong acid must be used as one ingredient of the hardener in order that the final acidity may be great enough to harden the formaldehyde-urea compound. If the hardener contained only ammonium salts of weak acids, the formaldehyde-urea solution containing the hardener would never become sufficiently acid.

If a solution is prepared from a formaldehyde-urea compound and an ammonium salt of a strong acid alone, the solution is initially acid, and its acidity rapidly increases as the ammonia from the ammonium salt of the strong acid combines with the free formaldehyde to form hexamethylenetetramine. When added along with the ammonium salt of the strong acid, an ammonium salt of a weak acid tends to neutralize the solution at the outset, but the acidity of the solution increases so rapidly that after a few seconds its acidity is the same as it initially would have been if the ammonium salt of the weak acid had been omitted. However, the solution prepared from an ammonium salt of a weak acid as well as an ammonium salt of a strong acid, which takes only a few seconds to become just as acid as it would have been initially if the salt of the weak acid had been omitted, nevertheless takes several times as long to become sufficiently acid so that the solution becomes stiff (as the formaldehyde-urea compound becomes gelled).

In fact the use of the ammonium salt of the weak acid retards the acidifying of the solution to such an extent that it makes possible the incorporation in the solution of a considerably greater amount of the ammonium salt of the strong acid than could otherwise be employed. Thus the inclusion of an ammonium salt of a weak acid makes it possible to prepare an adhesive which is stable enough to give the operator ample time to apply it but which becomes very strongly acid after it has been applied, so that the formaldehyde-urea compound is fully converted to the insoluble form. After the effect of the ammonium salt of the weak acid has worn off, the hardening of an adhesive solution embodying the present invention takes only a fraction as long as the hardening of an adhesive solution containing the maximum quantity of the ammonium salt of the strong acid that can be used when the ammonium salt of the weak acid is absent.

For example, a solution can be prepared from a formaldehyde-urea compound, ammonium chloride and ammonium borate which takes five times as long to become stiff as a similar solution containing no ammonium borate and half as much ammonium chloride. The latter solution becomes stiff so fast that it is not suitable for commercial use. Yet after the latter solution has been applied as an adhesive, the resulting bond takes a week to attain its maximum strength, whereas a bond from the former solution takes only twenty-four hours.

Ammonium salts of strong acids that may be employed are ammonium chloride, ammonium sulphate, ammonium bromide and any other stable ammonium salt of a strong acid. When these salts are used in the hardener, ammonium borate is preferably employed as the ammonium salt of the weaker acid. Ammonium carbonate may be used when the formation of carbon dioxide bubbles in the adhesive during the hardening thereof is not objectionable.

When the hardener is made from ammonium chloride and ammonium borate, the quantity of ammonium borate is preferably substantially as great as the quantity of ammonium chloride. If desired, the quantity of ammonium borate may be several times as great.

In general the quantity of the ammonium salt of the weak acid that is employed need be no greater than necessary to produce the desired delay in the stiffening of the adhesive. The quantity of the ammonium salt of the strong acid in the hardener should be sufficient so that the hardening takes place with the desired rapidity after the retarding effect of the ammonium salt of the weak acid has worn off.

A superior adhesive is produced if a substantial quantity of urea is added to the formaldehyde-urea solution along with the hardener. A filler or extender such as rye flour may be added if desired. The invention is applicable to adhesives used in hot-pressing as well as cold-pressing operations. Articles such as sheets of plywood that have been cold-pressed may be stored at an elevated temperature to hasten the hardening of the adhesive after they have been removed from the press. Cold-pressing followed by storage at an elevated temperature is less expensive than hot-pressing because of the lower cost of the equipment that is required.

Although the invention is particularly applicable to formaldehyde-urea adhesives, it is useful in the hardening of other solutions, such as coating compositions and liquids used for impregnating. In the preparation of a formaldehyde-urea solution for use in an adhesive it is usually desirable to carry the formaldehyde-urea reaction as far as possible without rendering the formaldehyde-urea compound insoluble.

A formaldehyde-urea solution suitable for use in an adhesive may be prepared as follows: Urea and formaldehyde in a molar ratio of 1 to 2 are gently refluxed in an aqueous solution that has been brought to pH 4.5–5.0 by means of sodium hydroxide. After the refluxing has been continued long enough (about 1 hour) to carry the formaldehyde-urea reaction to the desired stage, the solution is neutralized and evaporated under a vacuum to the desired concentration. A hardener embodying the present invention may be added directly to the resulting solution, or the formaldehyde-urea compound may be obtained in granular or powdered form, to facilitate shipment, by drum-drying or spray-drying the formaldehyde-urea solution. In any case, all the necessary ingredients are brought together in the form of a solution immediately before the adhesive is to be applied.

Various embodiments of the invention may be devised to meet various requirements.

Having described my invention, I claim:

1. A hardener for formaldehyde-urea solutions comprising a dry mixture of an ammonium salt of a strong acid and an ammonium salt of a substantially weaker acid.

2. A hardener for formaldehyde-urea solutions comprising a dry mixture of ammonium chloride and ammonium borate.

3. A hardener for formaldehyde-urea solutions comprising a dry mixture of urea, an ammonium salt of a strong acid and an ammonium salt of a substantially weaker acid.

4. A hardener for formaldehyde-urea solutions comprising a dry mixture of urea, ammonium chloride, and a quantity of ammonium borate substantially as great as the quantity of ammonium chloride.

5. A dry mixture comprising a soluble formaldehyde-urea reaction product, an ammonium salt of a strong acid and an ammonium salt of a substantially weaker acid.

6. A dry mixture comprising a soluble formaldehyde-urea reaction product, ammonium chloride and ammonium borate.

7. A potentially reactive solution prepared from a soluble formaldehyde-urea reaction product, an ammonium salt of a strong acid, and an ammonium salt of a substantially weaker acid.

8. A potentially reactive solution prepared from a soluble formaldehyde-urea reaction product, urea, an ammonium salt of a strong acid, and ammonium borate.

9. A potentially reactive solution prepared from a soluble formaldehyde-urea reaction product, ammonium chloride and ammonium borate.

10. A method of making a potentially reactive solution that comprises preparing a solution from a formaldehyde-urea reaction product, a dry ammonium salt of a strong acid, and a dry ammonium salt of a substantially weaker acid.

11. A method of making a potentially reactive solution that comprises preparing a solution from a dried formaldehyde-urea reaction product, dry ammonium chloride and dry ammonium borate.

ARTHUR M. HOWALD.